(12) United States Patent
Gollier

(10) Patent No.: US 7,837,332 B2
(45) Date of Patent: Nov. 23, 2010

(54) LASER PROJECTION UTILIZING SPATIAL BEAM MISALIGNMENT

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 561 days.

(21) Appl. No.: 12/002,869

(22) Filed: Dec. 19, 2007

(65) Prior Publication Data

US 2009/0161075 A1 Jun. 25, 2009

(51) Int. Cl.
*G03B 21/14* (2006.01)
(52) U.S. Cl. .................. 353/30; 353/94; 359/207.8; 359/629; 359/634
(58) Field of Classification Search .............. 359/204.1, 359/204.2, 204.3, 204.4, 207.8, 207.9, 629, 359/630, 634, 637, 638; 353/20, 30, 48, 353/49, 50, 94; 372/23, 24, 27
See application file for complete search history.

(56) References Cited

U.S. PATENT DOCUMENTS

| | | | |
|---|---|---|---|
| 4,851,918 A | 7/1989 | Crowley | 358/231 |
| 4,870,268 A * | 9/1989 | Vincent et al. | 250/226 |
| 5,071,225 A * | 12/1991 | Inoue | 359/634 |
| 5,229,593 A | 7/1993 | Cato | 250/205 |
| 5,451,765 A | 9/1995 | Gerber | 250/205 |
| 5,665,942 A | 9/1997 | Williams et al. | 178/18 |
| 6,020,937 A | 2/2000 | Bardmesser | 348/756 |
| 6,091,521 A * | 7/2000 | Popovich | 359/15 |
| 6,945,652 B2 | 9/2005 | Sakata et al. | 353/30 |
| 7,007,848 B2 | 3/2006 | Li | 235/462.21 |
| 7,023,512 B2 | 4/2006 | Kurtz et al. | 349/117 |
| 7,065,106 B2 | 6/2006 | Aronson | 372/9 |
| 7,255,455 B2 | 8/2007 | Johansen | 362/161 |
| 2003/0039036 A1 | 2/2003 | Kruschwitz et al. | 359/707 |
| 2005/0007562 A1 | 1/2005 | Seki et al. | 353/98 |
| 2005/0110954 A1 | 5/2005 | Kojima | 353/31 |
| 2005/0195868 A1 | 9/2005 | Moran et al. | 372/38.1 |
| 2005/0205755 A1 | 9/2005 | Walsh et al. | 250/205 |
| 2005/0213180 A1 | 9/2005 | Lopez-Hernandez et al. | 359/237 |
| 2005/0254008 A1 | 11/2005 | Ferguson et al. | 351/205 |
| 2006/0013533 A1 | 1/2006 | Slatkine | 385/31 |
| 2006/0198405 A1 | 9/2006 | Guenter et al. | 372/29.021 |
| 2009/0161705 A1 * | 6/2009 | Almoric et al. | 372/24 |

FOREIGN PATENT DOCUMENTS

WO WO2005/046249 5/2005

* cited by examiner

*Primary Examiner*—William C Dowling
(74) *Attorney, Agent, or Firm*—Gregory V. Bean

(57) ABSTRACT

Laser projection systems are provided comprising a laser source, scanning optics, beam splitting optics, and a scanning controller. According to one embodiment, the laser source is configured to produce at least two optical beams having different emission wavelength spectrums. The beam splitting optics are positioned downstream of the scanning optics and are configured to generate wavelength-dependent spatial misalignment of the two optical beams in the image plane by splitting the two optical beams into spatially misaligned propagating axes. According to another embodiment of the present invention, the beam splitting optics are positioned downstream of the scanning optics and are configured to generate polarization-dependent spatial misalignment of the two optical beams.

24 Claims, 3 Drawing Sheets

LASER PROJECTION UTILIZING SPATIAL BEAM MISALIGNMENT

BACKGROUND OF THE INVENTION

The present invention relates to laser projection systems and methods of laser projection utilizing a plurality of optical beams characterized by different wavelength spectrums. More specifically, the present invention relates to the design and operation of projection systems that decreases eye power exposure in laser projectors while avoiding or at least minimizing image degradation during laser projection.

BRIEF SUMMARY OF THE INVENTION

Many safety regulations governing the design and operation of scanning laser projection systems establish a maximum laser power exposure threshold that should not be exceeded during scanning operations. These exposure limits are often related to the class of laser in use. According to one set of safety standards, one important parameter to determine is the surface over which the energy is concentrated at the output of the projection system. In laser scanning systems where a small scanning mirror is used to generate the image, the maximum surface over which the energy can be spread is limited by the surface of the mirror. In other frame projections systems using a spatial modulator to generate the image, that surface is determined by the size of the exit pupil of the projection lens.

The inventors have recognized that the exposure limit is linked to the power density at the level of the pupil of the projecting instrument. Spreading the energy over a larger surface improves the exposure limit. In laser scanning systems, for instance, the maximum size over which the energy can be spread is limited by the maximum size of the scanning mirror. Because of the very high scanning speeds, the mirror size is limited to approximately 1 mm. According to one embodiment of the present invention, a laser projection system is provided comprising a laser source, beam splitting optics, and a controller. Multiple beams generated by the laser source are split after reflection by the scanning optics. This splitting artificially creates multiple images of the projector pupil and, therefore, spreads the energy over a larger area.

The present inventors have also recognized that imaging operations according to the present invention may be optimized by recognizing that, when considering the color sensitivity of the human eye, the relative power required to generate a white screen is around 50% of red, 30% of green, and 20% of blue. As a consequence, the power amplitude of the images of the different colors is not equal and the imaging operation can be optimized to take into consideration the different amplitudes for each color. Accordingly, particular imaging modes according to the present invention consist of keeping the optical beams comprising blue and green wavelength spectra correctly aligned and shifting them with respect to the optical beam comprising the red wavelength spectra. In which case, the scanning system would consist of only two optical paths with equal relative amplitudes.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

In the following detailed description, reference is made to the accompanying drawings that form a part hereof, and in which are shown by way of illustration, and not by way of limitation, specific embodiments in which the invention may be practiced. It is to be understood that other embodiments may be utilized and that changes may be made without departing from the spirit and scope of the present invention.

Figure 1A:
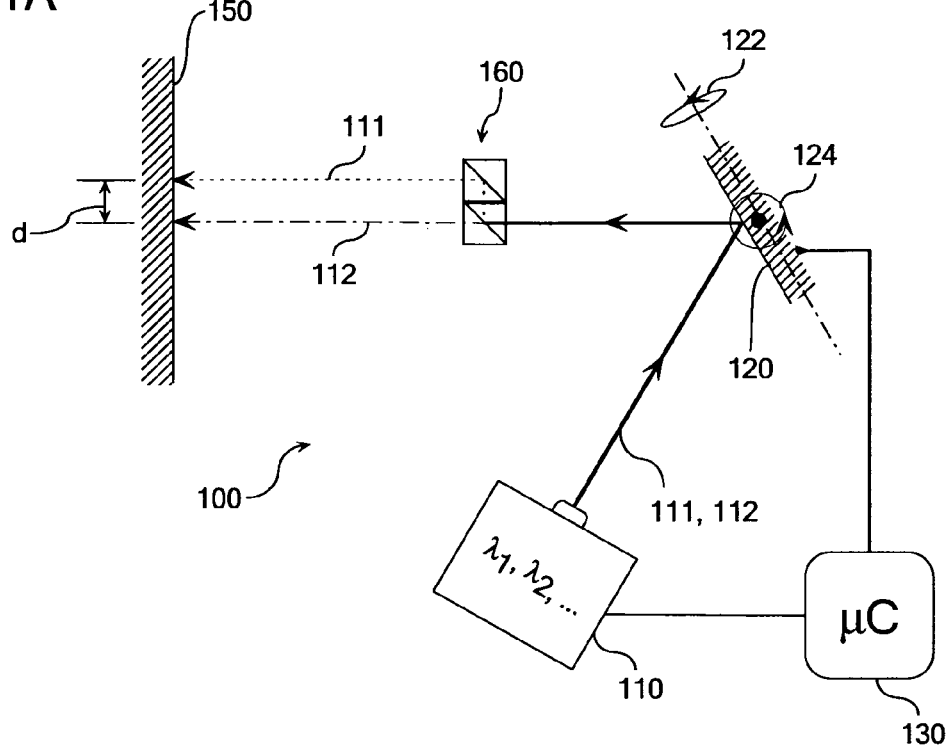
FIGS. 1A and 1B are general schematic illustrations of laser projection systems according to two embodiments of the present invention.
Figure 1B:
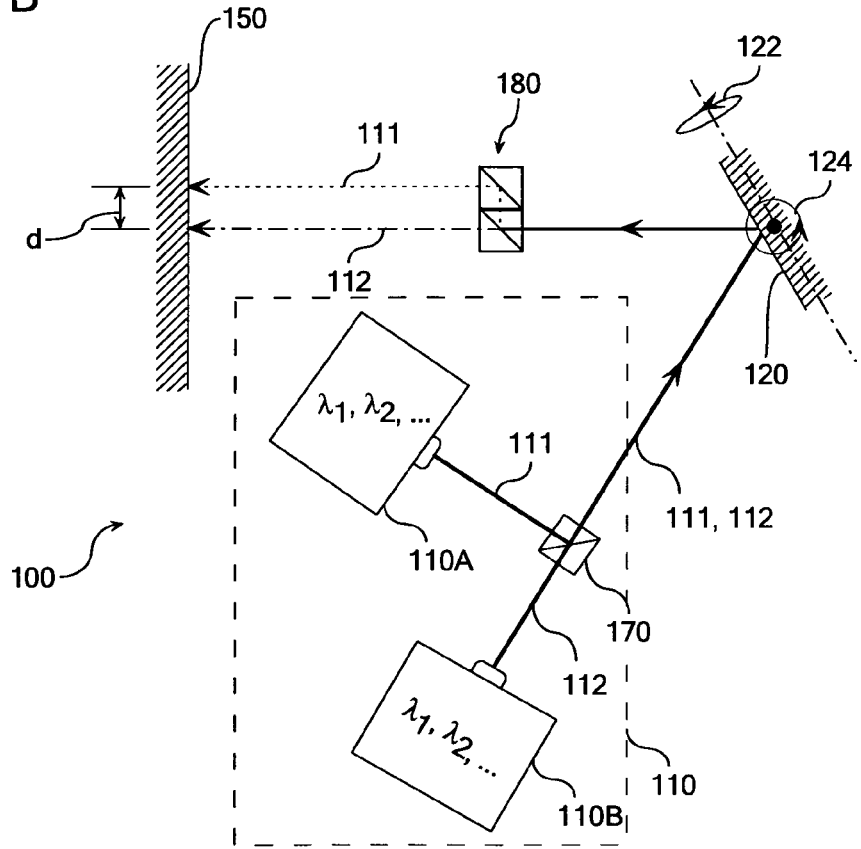

FIGS. 1A and 1B are general schematic illustrations of two laser projection systems 100 for achieving controlled spatial misalignment of two or more optical beams in an image plane. More specifically, referring to the embodiment of FIG. 1A and the illustration of FIG. 2, the laser projection system 100 comprises a laser source 110, scanning-type projection optics 120, beam splitting optics 160, and a scanning controller 130. The laser source 110 is configured to produce at least two optical beams 111, 112. The fist optical beam 111 produced by the laser source 110 is characterized by a wavelength spectrum that is distinct from the wavelength spectrum of the second optical beam 112. Further, the scanning controller 130 is configured to drive the scanning-type projection optics 120 to define a first scanning axis direction 220 in which lines of an image are projected in an image plane 150 and a second scanning axis direction 230 in which the optical beams address successive lines of the projected image 150.

As is illustrated in FIG. 1A, the laser source 110 is configured such that the first and second optical beams 111, 112 are directed to the scanning-type projection optics 120 along a substantially common propagating axis. The beam splitting optics 160 are configured to generate wavelength-dependent, spatial misalignment of the two optical beams 111, 112 in the image plane 150 by splitting the two optical beams into substantially parallel propagating axes separated by a distance d, after deflection by the scanning optics 120. In the illustrated embodiment, the beam splitting optics 160 comprises a wavelength-dependent beam splitter and suitable optical reflecting surfaces configured to direct the optical beams towards the image plane 150. As such, in the configuration of FIG. 1A, an observer located in front of the projector 100 may see two bright spots corresponding to the images of the projector pupil through the beam splitting optics 160. The energy density in W/mm$^2$ is therefore decreased resulting in an improvement of the maximum exposure factor. It should also be understood on FIG. 1A that the beam splitters are located very close to the scanning mirror so that the beams are separated before the total size of the beam has significantly been increased by the large scanning angle of the mirror.

In the illustrated embodiment the scanning-type projection optics 120 is presented in the form of a scanning mirror which may comprise, for example, a two-axis, gimbal-mounted, MEMS scanning mirror that deflects the optical beams 111, 112 through a deflection angle of about +/−60 degrees about two orthogonal scanning axes 122, 124. Although the various embodiments of the present invention are described herein with reference to a scanning mirror 120, it is contemplated that a variety of conventional or yet to be developed optical configurations may be employed to form suitable scanning-type projection optics for practicing the present invention.

Figure 2:
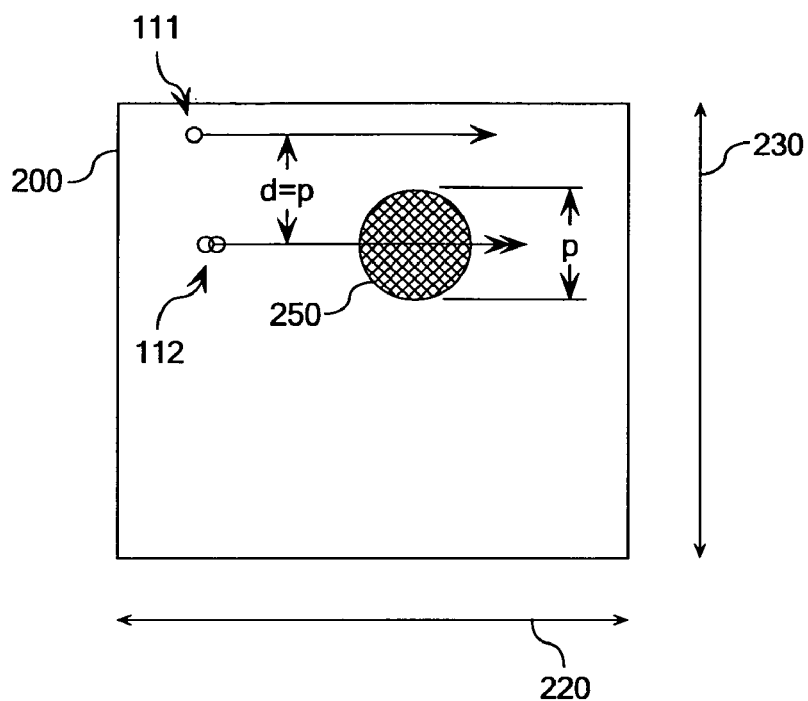
FIGS. 2-4 are schematic illustrations of respective deflections of two misaligned optical beams in an image plane.

FIG. 2, which shows the image plane 200 and a pupil 250 of an eye schematically, and not necessarily to scale, illustrates the case where the respective deflections of the first and second optical beams 111, 112 are spatially misaligned by the spatial dimension d in the first scanning axis direction 220 by an amount equal to one full spatial extent p of a standard eye pupil. In that case, the eye will never collect the beam 111 and 112 at the same time. So, on top of being separated spatially, the light that is collected is also separated in time. By introducing the beam splitting in the direction of the slow image scanning, we can make sure that the pulses collected from the beam 111 are separated from the pulses collected from the beam 112 by a delay larger than the time constant of the eye often defined as being around 18 microseconds.

Figure 3:
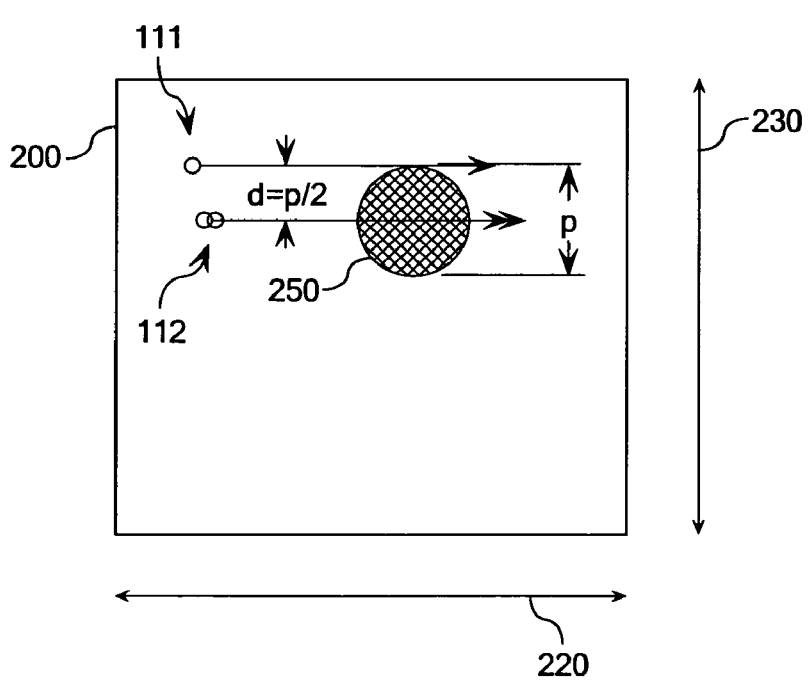
Figure 4:
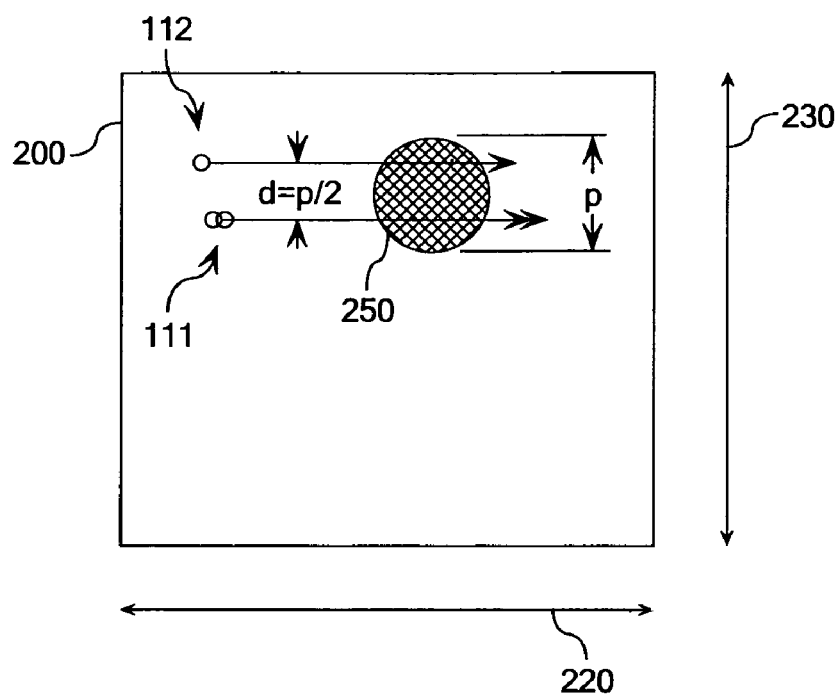

FIGS. 3 and 4 illustrate the case where the first and second optical beams 111, 112 are spatially misaligned in the image plane 200 by one half of a pupil diameter p. In this case, the energy per pulse is nearly kept constant because one beam spot, i.e., that of the second optical beam 202, contributes its maximum energy to the pupil 250 when the other beam spot, i.e., that of the first optical beam 201, contributes its minimum energy to the pupil. In addition, as the first beam spot, i.e., that of the second optical beam 202, moves from the maximum energy position illustrated in FIG. 3, to lower energy position closer to the edge of the pupil 250, as is illustrated in FIG. 4, the second beam spot, i.e., that of the first optical beam 201, moves from the minimum energy position illustrated in FIG. 3, to a higher energy position closer to the center of the pupil 250, as is illustrated in FIG. 4. As a result, the oscillation in energy per pulse will not be as extreme as is the case where the respective deflections of the first and second optical beams 111, 112 are spatially misaligned by one pupil diameter p. In other words, the maximum energy per pulse for the configuration of FIG. 3 will be the same for the configuration of FIG. 4, although the beam separation is smaller in FIG. 4.

Referring further to FIG. 2 and the embodiment illustrated in FIG. 1A, the second optical beam 112 is shown schematically in FIG. 2 as a dual-color optical beam to help illustrate an additional aspect of the embodiment of FIG. 1A. Specifically, although working with as many shifted beams as possible would, in many cases, be the ideal situation for staying below the exposure limit, it may be desirable to restrict the number of shifted beams to avoid excess degradation in the duty factor of the laser projection system 100. Accordingly, one optimum solution contemplates the use of two shifted optical beams, one containing red and the other one containing blue and green. From an alternative perspective, where the scanning controller 130 is configured to generate a scanned laser image based on a set of image data using one optical beam including two visually distinct colors and another optical beam including a single visually distinct color, the respective chromatic contributions of each beam to the image can be taken into account in determining which color to isolate in the single-color beam. More specifically, according to the contemplated embodiment, the color allocation can be such that the chromatic contribution of the color selected for the single color beam is more than the respective chromatic contributions of either of the two visually distinct colors of the dual-color beam. For purposes of describing and defining the present invention, it is noted that the "chromatic contribution" of a particular color to a scanned image can be measured in terms of amplitudes of the optical pulses required to generate the image. For example, in the case of the red/green/blue example identified above, the relative power between the three optical beams required to generate a white screen is around 50% of red, 30% of green and 20% of blue. As a consequence, the chromatic contribution of red light can be said to be 50%. So, by separating red as beam 111 and blue plus green as beam 112, the power is homogeneously distributed between both optical paths.

To ensure proper image registration, the sources generating the beams 111 and 112 would be individually modulated to permit the aforementioned image data delay and allow proper image registration. The image data delay would need to be adjusted as a function of the screen distance. This can be done manually or automatically by using systems equivalent to focus sensors.

Referring now to the embodiment of the present invention illustrated in FIG. 1B, it is noted that the laser source 110 comprises at least two complementary and distinct sub-sources 110A, 110B having perpendicular polarization vectors. Collectively the laser source 110 produces two optical beams 111, 112, each of which is attributable to one of the sub-sources 110A, 110B. Further, the laser source 110 comprises a polarizing component 170 that is configured to combine by polarization the sources 110A and 110B. Further, the laser source 110 is configured such that, downstream of the polarizing component, the first and second optical beams 111, 112, propagate along a common optical axis towards the scanning-type projection optics 120 and maintain their distinct polarizations. Polarization-dependent beam splitting optics 180 are positioned downstream of the scanning-type projection optics 120 and are configured to generate polarization-dependent misalignment of the two optical beams 111, 112 in the image plane 150 by splitting the two optical beams 111, 112 into substantially parallel propagating axes separated by a distance d. Typically, the polarization-dependent beam splitting optics 180 comprises a polarization-dependent beam splitter and suitable optical reflecting surfaces configured to direct the optical beams towards the image plane 150.

It is contemplated that, in the case of FIG. 1B, the beams 111 and 112 can define equivalent or different wavelength spectrums. For example, both beams might contain the three colors RGB, in which case, each laser source 110A and 110B would comprise three lasers corresponding to the three colors. As is the case with the embodiment illustrated in FIG. 1A, to ensure proper image registration, the sources 110A and 110B would be individually modulated to permit the aforementioned image data delay and allow proper image registration. As is described above, the image data delay would need to be adjusted as a function of the screen distance.

According to one aspect of the present invention, the embodiments illustrated in FIGS. 1A and 1B can be modified such that the split, spatially misaligned optical beams 111, 112 define propagating axes that converge to be incident on the same location on a projection screen positioned in the image plane 150 at a given projection distance. This convergence can be generated by suitable modification of the wavelength or polarization-dependent beam splitting optics 160, 180 illustrated schematically in FIGS. 1A and 1B. As a result, the aforementioned image data delay between the two beams 111, 112 becomes unnecessary for one specific distance of the screen, and the corresponding degradation of the projection duty factor is eliminated, because the misaligned beams 111, 112 would now converge on a common point in the image plane 150.

In addition, by ensuring that the spatially misaligned optical beams 111, 112 define propagating axes that converge to be incident on the same location on a projection screen at a given projection distance, it is contemplated that the spatial misalignment concepts discussed herein should not be restricted to laser scanner projection systems. Indeed, the spatial misalignment techniques described herein may apply to any projection system having an exit pupil able to accommodate wavelength-dependent or polarization-dependent beam splitting optics. Accordingly, the techniques of the present invention will be applicable to frame laser projection systems, where the image is generated by a one-dimensional or two-dimensional spatial light modulator, holographic laser projection systems, where a spatial light modulator is used to create a hologram that generates the image, LED projection systems, etc. In which case, the beam splitting optics of the embodiment illustrated in FIG. 1A should then be integrated in the system downstream of the projection optics used in the aforementioned non-scanning projector configurations.

For example, where the laser source comprises a one-dimensional or two-dimensional spatial light modulator, the controller will comprise a spatial modulation controller, which can be programmed to: (i) generate an image based on a set of image data comprising a first image data portion dedicated to the first optical beam and a second image data portion dedicated to the second optical beam and (ii) generate a relative shift between the first and second image data portions, wherein the shift is a function of the spatial separation of the parallel propagating axes of the first and second optical beams. Typically, the spatial separation of the parallel propagating axes will be at least approximately 3.5 mm.

Figure 5:
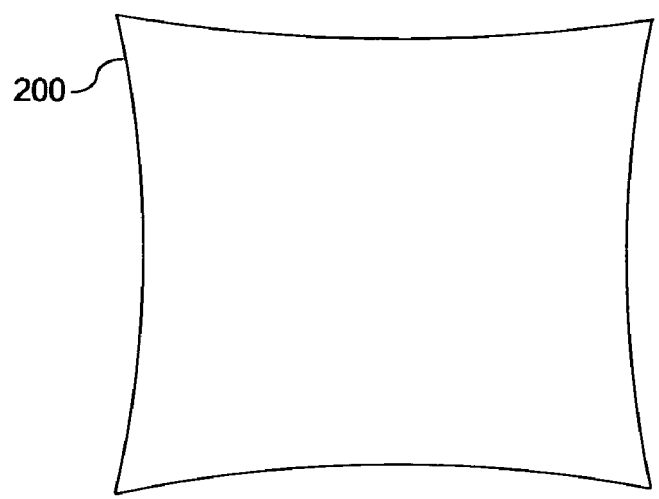
FIG. 5 is an illustration of distortion in a scanned laser image.

Another important parameter to take into consideration in the design of a laser projection system may be associated with image distortion. Typical scanning-based laser projection systems will present some degree of distortion in the projected image. For example, referring to the image 200 of FIG. 5, the image of a square may not be exactly a square. Accordingly, image distortion algorithms are commonly applied in such systems to compensate for the distortion. Considering the case where multiple optical beams are used that have different incidence angles over the rotating mirror, as is described herein, the problem becomes somewhat more complex. Indeed, the distortion pattern becomes a function of the incidence angle over the rotating mirror. As a consequence, introducing a delay between the optical beams may not be sufficient to insure the co-registration of the images. As a consequence, in order to insure the proper image quality, distinct image distortion correction algorithms may be needed over each optical beam in order to ensure the image co-registration over the entire surface of the image.

Therefore, by introducing distinct image distortion correction algorithms, maximum exposure factors of a laser projection system can be improved without requiring any additional hardware to the laser projector. In one embodiment, the scanning controller may be programmed to generate a scanned laser image based on a set of image data dedicated to each of the optical beams. The set of image data can be comprised of individual image data portions. Distinct image distortion correction algorithms can be applied to each of the optical beam image data portions. Differences between the distinct image distortion correction algorithms can be a function of the spatial misalignment imparted to the optical beams in the second scanning axis direction.

Similarly, additional complexity may be introduced where a relatively large delay may be required between the optical beams, particularly where the magnitude of the delay would dictate that the scanning controller 130 utilize large sized data buffers. In one embodiment of the present invention, the scanning controller 130 can be programmed to generate a scanned laser image based on a set of image data dedicated to each of the optical beams. The set of image data can be comprised of individual image data portions. The individual image data portions can then be delayed relative to each other by a duration that can be a function of the spatial misalignment imparted to the optical beams in the second scanning axis direction.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

It is noted that recitations herein of a component of the present invention being "programmed" in a particular way, "configured" or "programmed" to embody a particular property, or function in a particular manner, are structural recitations as opposed to recitations of intended use. More specifically, the references herein to the manner in which a component is "programmed" or "configured" denotes an existing physical condition of the component and, as such, is to be taken as a definite recitation of the structural characteristics of the component.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A laser projection system comprising a laser source, projection optics, beam splitting optics, and a controller, wherein:

the laser source is configured to produce at least two optical beams such that a first optical beam produced by the laser source is characterized by a wavelength spectrum or polarization that is distinct from a wavelength spectrum or polarization of a second optical beam produced by the laser source; and the beam splitting optics are positioned downstream of the projection optics and are configured to generate wavelength-dependent or polarization-dependent spatial misalignment of the two optical beams in the image plane by splitting the two optical beams into spatially misaligned propagating axes.

2. A laser projection system as claimed in claim 1, wherein the projection optics comprise scanning-type projection optics and the controller comprises a scanning controller.

3. A laser projection system as claimed in claim 2, wherein the scanning controller is configured to drive the scanning optics to define a first scanning axis direction in which lines of an image are projected in an image plane and a second scanning axis direction in which the optical beams address successive lines of the projected image.

4. A laser projection system as claimed in claim 3, wherein the beams are separated by more than 3.5 mm in the direction that corresponds to the slow scanning axis direction of the scanning mirror.

5. A laser projection system as claimed in claim 2, wherein the scanning controller is programmed to:

generate a scanned laser image based on a set of image data comprising a first image data portion dedicated to the first optical beam and a second image data portion dedicated to the second optical beam; and apply distinct image distortion correction algorithms to the first and second image data portions, wherein differences between the distinct image distortion correction algorithms are a function of the spatial misalignment imparted to the first and second optical beams.

6. A laser projection system as claimed in claim 2, wherein the scanning controller is programmed to:

generate a scanned laser image based on a set of image data comprising a first image data portion dedicated to the first optical beam and a second image data portion dedicated to the second optical beam; and delay the first and second image data portions relative to each other by a duration that is a function of the spatial separation of the parallel propagating axes of the first and second optical beams.

7. A laser projection system as claimed in claim 6, wherein the delay duration is additionally a function of a distance to a projection screen in the image plane.

8. A laser projection system as claimed in claim 1, wherein the projection optics comprise non-scanning type projection optics.

9. A laser projection system as claimed in claim 8, wherein the laser source comprises a one-dimensional or two-dimensional spatial light modulator or a holographic laser projector.

10. A laser projection system as claimed in claim 8, wherein the laser source comprises a one-dimensional or two-dimensional spatial light modulator and the controller comprises a spatial modulation controller programmed to:

generate an image based on a set of image data comprising a first image data portion dedicated to the first optical beam and a second image data portion dedicated to the second optical beam; and generate a relative shift between the first and second image data portions, wherein the shift is a function of the spatial separation of the parallel propagating axes of the first and second optical beams.

11. A laser projection system as claimed in claim 10, wherein the spatial separation of the parallel propagating axes is at least 3.5 mm.

12. A laser projection system as claimed in claim 1, wherein:

the laser source is configured to produce at least two optical beams such that a first optical beam produced by the laser source is characterized by a wavelength spectrum that is distinct from a wavelength spectrum of a second optical beam produced by the laser source;

the beam splitting optics are positioned downstream of the projection optics and are configured to generate wavelength-dependent spatial misalignment of the two optical beams in the image plane by splitting the two optical beams into spatially misaligned propagating axes.

13. A laser projection system as claimed in claim 12, wherein the beam splitting optics comprise a wavelength-dependent beam splitter.

14. A laser projection system as claimed in claim 12, wherein the laser source is configured such that the wavelength spectrum of the first optical beam comprises two visually distinct colors.

15. A laser projection system as claimed in claim 14, wherein the laser source is configured such that the wavelength spectrum of the second optical beam comprises a single visually distinct color.

16. A laser projection system as claimed in claim 15, wherein the two visually distinct colors comprise blue and green and the single visually distinct color comprises red.

17. A laser projection system as claimed in claim 12, wherein:

the projection optics comprise scanning-type projection optics and the controller comprises a scanning controller;

the scanning controller is configured to drive the scanning optics to define a first scanning axis direction in which lines of an image are projected in an image plane and a second scanning axis direction in which the optical beams address successive lines of the projected image;

the scanning controller is configured to generate a scanned laser image based on a set of image data;

the laser source is configured such that the wavelength spectrum of the first optical beam includes two visually distinct colors and the wavelength spectrum of the second optical beam comprises a single visually distinct color; and the chromatic contribution of the single visually distinct color to the scanned laser image is more than the respective chromatic contributions of either of the two visually distinct colors of the first optical beam.

18. A laser projection system as claimed in claim 1, wherein:

the laser source is configured to produce at least two optical beams such that a first optical beam produced by the laser source is characterized by a polarization that is distinct from a polarization of a second optical beam produced by the laser source; and the beam splitting optics are positioned downstream of the scanning optics and are configured to generate polarization-dependent spatial misalignment of the two optical beams in the image plane by splitting the two optical beams into spatially misaligned propagating axes.

19. A laser projection system as claimed in claim 18, wherein the laser source comprises at least two complementary and distinct sub-sources characterized by perpendicular polarization vectors.

20. A laser projection system as claimed in claim 18 wherein the laser source comprises a polarizing component configured to combine the first and second optical beams by polarization.

21. A laser projection system as claimed in claim 18, wherein the beam splitting optics comprise a polarization-dependent beam splitter.

22. A laser projection system as claimed in claim 1, wherein the spatially misaligned propagating axes are substantially parallel.

23. A laser projection system as claimed in claim 1, wherein the spatially misaligned propagating axes converge to be incident on the same location on a projection screen positioned in the image plane at a given projection distance.

24. A laser projection system as claimed in claim 1, wherein the laser source is configured such that the first and second optical beams are directed to the projection optics substantially along a common propagating axis.

* * * * *